US011233802B1

(12) United States Patent
Rudeanu et al.

(10) Patent No.: US 11,233,802 B1
(45) Date of Patent: Jan. 25, 2022

(54) COOKIE AND BEHAVIOR-BASED AUTHENTICATION

(71) Applicant: Amazon Technologies, Inc., Seattle, WA (US)

(72) Inventors: Corneliu-Gabriel-Alexandru Rudeanu, Lasi (RO); Florin-Vasile Manolache, Lasi (RO); Alexandru Tronciu, Roman (RO)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/899,379

(22) Filed: Jun. 11, 2020

(51) Int. Cl.
*H04L 29/06* (2006.01)
*H04L 29/08* (2006.01)
*G06F 16/958* (2019.01)
*G06F 21/62* (2013.01)

(52) U.S. Cl.
CPC .......... *H04L 63/126* (2013.01); *G06F 16/958* (2019.01); *G06F 21/6263* (2013.01); *H04L 63/0435* (2013.01); *H04L 63/08* (2013.01); *H04L 63/14* (2013.01); *H04L 67/02* (2013.01)

(58) Field of Classification Search
CPC .......... H04L 63/1441; H04L 2463/144; H04L 63/14; H04L 67/02; H04L 67/22; H04L 63/08; H04L 63/0823; H04L 63/0807; H04L 63/168; H04L 9/0825; H04L 63/0428; H04L 9/3226; G06F 21/31; G06F 21/6263; G06F 21/33; G06F 2221/2137
See application file for complete search history.

(56) References Cited

U.S. PATENT DOCUMENTS

| 8,578,462 | B2 * | 11/2013 | Petrovic | ................ | H04L 9/3297 |
| | | | | | 726/9 |
| 9,444,620 | B1 | 9/2016 | Murphy et al. | | |
| 10,033,719 | B1 | 7/2018 | Baranowski et al. | | |
| 10,270,792 | B1 * | 4/2019 | Shemesh | ............. | H04L 63/1441 |

(Continued)

FOREIGN PATENT DOCUMENTS

EP        1422907 A2    5/2004

OTHER PUBLICATIONS

R. T. Prapty, S. Azmin Md, S. Hossain and H. S. Narman, "Preventing Session Hijacking using Encrypted One-Time-Cookies," 2020 Wireless Telecommunications Symposium (WTS), 2020, pp. 1-6, doi: 10.1109/WTS48268.2020.9198717.*

(Continued)

*Primary Examiner* — Chirag R Patel
(74) *Attorney, Agent, or Firm* — Davis Wright Tremaine LLP

(57) ABSTRACT

A client sends a request for access to a webpage and receives a cookie and code to obtain data about the client in response to the request. The cookie may be cryptographically secured and contain first data about the client. The client subsequently sends a second request with the cookie to access the same webpage. Any additional information about the client, received in the second request, is then compared with the first data about the client obtained from the cookie to determine whether anomalous activity exists in connection with the client. That is, data about the client is compared to previous client activity history to determine whether there were any anomalous activity and the result of the comparison indicates whether the client is trustworthy.

20 Claims, 8 Drawing Sheets

(56) References Cited

U.S. PATENT DOCUMENTS

| | | | | |
|---|---|---|---|---|
| 2017/0223049 | A1* | 8/2017 | Kuperman | H04L 63/1466 |
| 2018/0034850 | A1* | 2/2018 | Turgeman | H04L 67/306 |
| 2018/0139228 | A1* | 5/2018 | Kanakarajan | H04L 63/08 |
| 2018/0302406 | A1* | 10/2018 | Burckhardt | H04L 63/08 |
| 2018/0359259 | A1* | 12/2018 | Leon | H04L 63/0428 |
| 2020/0028926 | A1* | 1/2020 | Sprague | H04L 9/0877 |
| 2020/0112578 | A1* | 4/2020 | Gupta | H04L 63/1425 |
| 2020/0374297 | A1* | 11/2020 | Bilas | H04L 9/3271 |
| 2020/0396233 | A1* | 12/2020 | Luo | G06F 21/552 |

OTHER PUBLICATIONS

Jones, M., et al., "JSON Web Token (JWT)," Request for Comments: 7519, Informational, May 2015, 30 pages.

International Search Report and Written Opinion dated Aug. 27, 2021, International Patent Application No. PCT/US2021/036496, filed Jun. 21, 2021.

* cited by examiner

US 11,233,802 B1

COOKIE AND BEHAVIOR-BASED AUTHENTICATION

BACKGROUND

Modern computer systems place a high importance on security of customer access to computing resources. As web applications are becoming increasingly prevalent, which may cause a number of issues including controlling administrative access to the web application, maintaining the web application in a manner that is secure from malicious attacks and ensuring that customer sessions with the web application are secure without being compromised have become increasing complex. Current methods of ensuring customer session security include session tracking using cookies. However, preventing session theft and otherwise maintaining high levels of security involves significant effort and resources. As one example, it is quite difficult to detect and react to unauthorized cookie sharing to prevent unauthorized load on a system.

BRIEF DESCRIPTION OF THE DRAWINGS

Various techniques will be described with reference to the drawings, in which.

DETAILED DESCRIPTION

Figure 1:
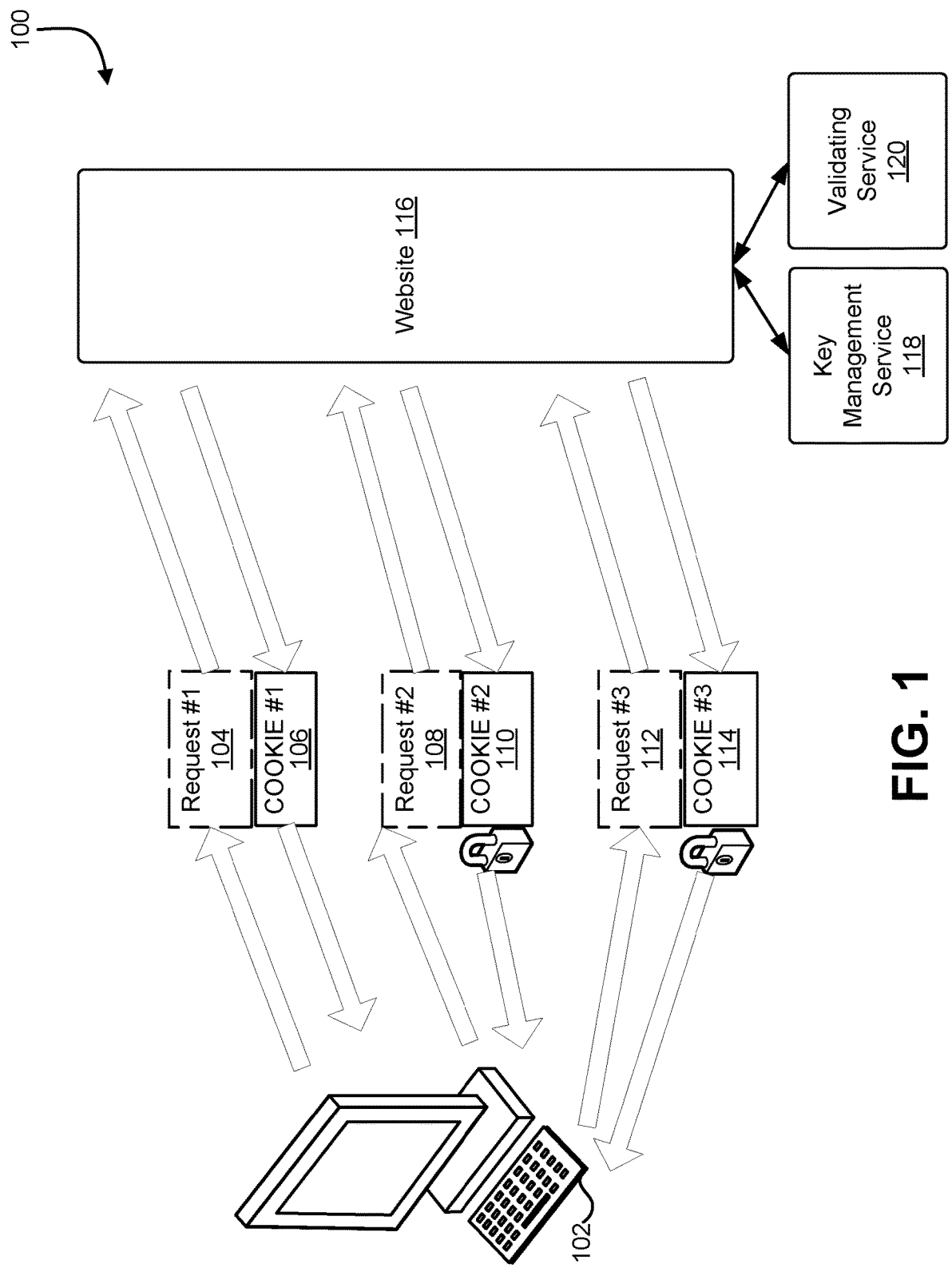
FIG. 1 illustrates a system in which one embodiment of using cookies to compare data about a client for access to a resource may be practiced.

Techniques described and suggested herein include methods and systems primarily for mitigating and resolving website session theft. Generally, session theft, also referred to as cookie hijacking, involves a malicious party, such as a hacker or a robot, exploiting a valid computer session in order to gain unauthorized access to information on a computer system or network. A session may be stolen by an attacker using one of many methods, such as by an inline program (e.g., a man-in-the-middle (MitM) attack), a source-routed Internet Protocol (IP) method, blind hijacking and cross-site scripting. Thus, the techniques described herein indicate an improvement in mitigating and resolving cookie hijacking by at least using information from a current cookie of a client and comparing that with information from previous cookies of the same client prior to authenticating the client for access to resources.

In other words, the techniques described herein enable authentication, authorization, and accounting for remote clients (e.g., browsers, applications, devices, etc.) for using multi-endpoint, cross-domain web services, web applications, and telemetry services, with automated agent ("bot" or "robot") detection built in. In one example, a system receives requests, from clients, to access computing resources and analyzes cookies that accompany the request. A cookie may contain client behavior information about the respective client, to enable the system to determine whether to grant access to the one or more computing resources.

A cookie is typically provided to a client in response to a request for a computing resource (e.g., website). Additionally, code that can be run to obtain data about the client (e.g., client behavior information) is also provided with the cookie. Once a subsequent request for access to the computing resource is received, the cookie (which includes embedded information about the client or links to data about the client) may be analyzed against historical data obtained about the client from previously used cookies and/or historical data from a log stored on the web server to determine whether there is an anomaly (e.g., indicative of suspicious activity) in client behavior. If there is no anomaly in client behavior, access to the one or more computing resources may be granted. Otherwise, access to the one or more computing resources may be restricted or denied or other mitigating operations may be performed. In other words, when a client seeks to revisit a webpage, for example, certain activity about the client is compared against historical activities about the same client to determine whether the client is trustworthy prior to providing access to the webpage.

As an example, a client uses a computing device to generate and send a first request (e.g., HyperText Transfer Protocol Secure (HTTPS) request) for access to a resource (e.g., webpage, network host, etc.). Generally, after the client establishes a session with a webpage, a cookie with a session identifier (session ID) is provided, by the web server hosting the webpage, to the client. In addition to the cookie, code may also be provided to the client so that actions about the client may be obtained. The cookie is created along with the established session in order to identify the session by the client's computing device. Session information or actions by the client are generally stored in the cookie and the cookie can be further stored on the web server using the session ID.

Subsequently, in some instances, the client sends the cookie and a second request to the web server for access to the same webpage or a different webpage hosted by the web server. The different webpage may be a sub-domain of the webpage (e.g., main domain). The web server, which receives the second request along with the cookie, may then identify and authenticate the client and send the client an authorization token that outlines what resources hosted by the web server the client may access. The web server may then, after the client is authenticated to access resource hosted by the web server, send a second cookie to the client. In some embodiments, the second cookie is also sent with code that can be run to obtain additional data about the client while the client navigates the resources hosted by the web server. In some instances, the second cookie includes client activity history about the client and that information may be cryptographically secured prior to the client receiving it. That is, the second cookie may be encrypted by a key provided by a key management service that is managed (or invoked by receiving instructions) from the web server. This way, only the web server is able to decrypt information from the second cookie when the client seeks to establish a connection again for access to resources provided by the web server.

In some instances, the client then sends a third request to access the same webpage or another webpage hosted by the same web server by providing the second cookie (which either has data about the client embedded therein or has a pointer to indicate where data about the client is stored). The web server may then use the second cookie to identify the client. Prior to providing access to resources hosted by the web server, however, the web server may invoke the key management service to decrypt the information contained in the second cookie. The key management service may provide the same key that was previously used to encrypt the second cookie to decrypt it. After decryption, the web server may invoke a security check to be performed. The security check may obtain data about the client that was sent along with the third request and compare it against client activity history about the client that was found in the second cookie. In some instances, the web server performs the security check after receiving the third request; however, in other instances, a proxy may be enlisted to intercept requests (such as the third request and any subsequent requests after that) that are directed to the web server to enlist the correct services and/or servers to perform these security checks. In some embodiments, a validation service or server (which is configured to perform comparison algorithms) may be invoked by the proxy to perform the security checks.

In some embodiments, the security check performs a comparison to determine whether anomalous behavior is associated with the client. Specifically, newly received data about the client that accompanied the third request is compared against data obtained from the second cookie (which has previous behavioral data about the client embedded therein or a link to this data) to determine whether anomalous client activity exists. As an example, the comparison may identify spikes in requests and/or certain patterns in accessed services and websites. These activities may be compared against historical data about the client to determine whether any of these activities are deemed anomalous. If these activities are deemed anomalous, the web server may determine to deny access to the client. On the other hand, if the security check determines that data about the client is ordinary, the web server may indicate that the client is an authenticated client and access to resources hosted by the web server may then be provided.

The security check is performed such that it ensures that the client is not an unauthorized entity (e.g., robot or malicious entity) attempting to gain access to resources hosted by the web server. In some instances, data about the client includes various types of client activity (e.g., client behavior) that are compared to previously stored client activity. That is, for example, a client may have a spike or increase in requests being submitted to the web server. This sudden spike in requests are provided as data about the client and compared to the previous numbers associated with requests that were made by the same client. In other words, the next time the client seeks access to a resource on the web server, the web server is able to analyze the most recent data about the client in comparison to historical information about the same client. The more recent data is compared against the historical information it has about the client to determine whether the client is potentially a malicious entity. To determine whether the number of requests is indeed an anomaly, the security check may compare the number of requests to a number of requests that was previously recorded and logged for the client for an indication on the amount of differences between them.

In another example, a client may be accessing webpages hosted by the web server in a pattern that is uncommon. That is, a client may establish a pattern that files and analyzes information through various webpages at a really fast pace (e.g., a bot web crawling). This pattern can be compared to the previous client activity and if the client activity has not performed this pattern before, then a security check would most likely result in determining that this client is malicious. Checking the amount of requests submitted by the client and checking the patterns of client activity are just two examples that can be considered during the security check. However, there may be additional factors that are also checked (which are described herein in more detail below) in addition to the two examples described above and all of these factors may each individually be weighted and/or considered together to determine whether a client is trustworthy or not.

Specifically, cookies (which either include data about the client or has links to data about the client) received as a result of requesting a resource are analyzed to determine if the information contained therein compared to a client's previous behavior (e.g., expected behavioral activity) is deemed anomalous. In some instances, a first request to access a resource is received and data is obtained about the client. A cookie, which has links to the data about the client, is then cryptographically secured and sent back to the client. Data about the client may include, for instance, information about the client computing device used to send the request, location of the client computing device, and/or which client is using the client computing device. Specifically, the data may include a client's IP address from where the request originated from, client/session ID, client device type. In some instances, historical information such as client browsing history, the amount of calls the client has made, timestamps, etc., are also provided as data about the client. When a second request is received by the same client using the cookie, data from the cookie may be obtained and compared with any additional data about the client that was received with the second request to determine how to process the second request.

In some instances, instead of checking information from the client against information contained in the cookie, a check is performed by determining whether information from the browsing history matches the information stored by the web server about this specific client. If there are discrepancies such as a spike in webpages being accessed, a subsequent step, for example, may be to determine whether the number of requests meet or exceed a threshold value. In an example, the predetermined threshold value may be set thirty webpages per minute. So, if more than thirty requests were being made within the minute, the web server may then determine that the client is denied access to any resources hosted by the web server. The client may then be denied access to the resources, or, in the alternative, access to the resources may be provided with limitations. Alternatively, if the number of requests is below or meets the threshold value, access to the resource may be provided to the client.

As one skilled in the art will appreciate in light of this disclosure, certain embodiments may be capable of achieving various advantages, including some or all of the following: (a) improving security, (b) mitigating and resolving website session theft (e.g., providing robot identification and preventing cookie cloning attacks), (c) provide alternate authentication mechanisms in the event of robot detection, (d) provide authorization policies in real-time, and (e) assign cookies across multiple domains based on client behavior information accessible by the multiple domains.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a system 100 in which one embodiment of using cookies to compare data about a client for access to a resource may be practiced. In an embodiment, a client computing device 102 may submit a request (e.g., HTTPS connection request) 104 via a network for access to a webpage of a website 116 (e.g., web server). The client computing device 102 (sometimes referred to herein simply as a user or client) may be any appropriate electronic device operable to send and receive requests, messages, and or other such information over an appropriate network. That is, in an embodiment, a client computing device 102 (which is also described as an electronic client device 802 in FIG. 8) may be a personal computer, a tablet computer, smart phone, a notebook computer, or the like. In addition, the client computing device 102 may also be a virtual machine or an instance of a virtual machine operating within a computing resource service provider. The client computing device 102 may send requests and messages over network. As shown in FIG. 1, client computing device 102 is the sole device illustrated; however, there may be more than one client computing device implemented to send requests and messages to access website 116.

The network may be any appropriate network, such as the Internet, intranet, a cellular network, and/or any combination thereof. The network may include one or more client computing devices, one or more servers, and/or clusters of servers interconnected with one another. The communication over the network may be performed over a wired or wireless connection. In an embodiment, the client computing device 102 sends the request 104 over network, such as the Internet, via a wired or wireless connection.

That is, as illustrated in FIG. 1, there may be a single endpoint, which is the website 116. The website 116 may be an end of a communication channel, represented as the Uniform Resource Locater (URL), of a computing resource. That is, in an embodiment, the website 116 acts as an entry point to the computing resource and can be accessed via the HyperText Transfer Protocol (HTTP)/HTTPS protocol. In an embodiment, one or more endpoints may also be used to correspond to one or more computing resources hosted by a computer resource service provider. That is, computer resource service provider may contain more than one computing resource than that is illustrated in FIG. 1 and more than one endpoint may correspond to these additional computing resources. In some instances, each of the one or more endpoints may be different (e.g., if a website provider runs the website from multiple data centres around the world) but still refer to the same resource. The one or more resources may be any one of: a webpage of a main website domain or its sub-domain.

That is, as depicted in FIG. 1, a cookie 106 may be provided, by the website 116, in response to the request 104 back to the client computing device 102. Generally, a computer session, sometimes referred to as simply a session, is a temporary or semi-permanent interactive information exchange or dialogue between two or more customer devices in order to initialize communication between the devices, such as client-server communication. Example embodiments of a session are generally established or created at a certain point and torn down or disconnected at a later point. Generally, upon creation of a session, a session ID, session token or other state identifier is associated with the created session in order to identify the session by a connected device such as client computing device 102. A session ID may be associated with a client operating the computing device 102 and session information or actions by the client are generally stored in a cookie 106 on a web server using the session ID. In some embodiments, a session ID is assigned associated with a client ID (after a client signs-in to the website using sign in credentials and authenticates itself).

That is, a session may be identified according to a session cookie or simply a cookie (e.g., small text file), which is generally a temporary cookie file that is stored on the computing device 102 and, in some examples, erased when the client closes the session. In many examples, a cookie is a key value pair of information that is provided to a server by a client each time the client sends a request to the web server in order to have the web server identify the client based at least in part on the cookie. In other example embodiments, a general-purpose cookie (e.g., an HTTP cookie, web cookie or browser cookie) may be used. A web cookie, for instance, is a small piece of data transmitted from the website and stored on a client's browser of the computing device 102 when the client is navigating on the website. Each time the client loads the website, the client must transmit the web cookie to the server with any requests in order to notify a web server of previous activity. In some instances, a fingerprint, a session token, secret state, identifier or other secret information may be used in place of a session cookie. Generally, tokens may be used in embodiments presented herein, where a cookie is just one example of a token.

Common uses for cookies include, for example, authentication, storing site preferences, storing shopping cart items and storing server session identification. For example, e-commerce websites that provide a shopping cart generally maintain a session cookie received from the client upon making a request for a webpage. This enables the website 116 to maintain information, such as changes to items in the shopping cart, from each webpage on the website 116 that is visited in order to make all information in the shopping cart available at any page, such as the checkout page. In some example embodiments, instead of storing information at a client using cookies, the client stores a unique session identifier that is passed to a web server each time the client generates a request. In some instances, data about the client is embedded in a cookie. However, in some instances, data about the client is found via a reference to the data from the cookie. That is, a cookie may be linked to data about the client. The reference may be the link from the cookie to obtain data about the client. In an embodiment, the reference indicates where in-memory cache data about the client can be found for a specific browser session. In some embodiments, the cookie is linked to data about the client such that once the cookie has been read by code run by the web server or client computer, data about the client can be retrieved from the cookie.

Further describing FIG. 1, as an example, after the client computing device 102 obtains the first cookie 106 and code that can be run to obtain data about the client, access to the same website 116 may be requested by the client computing device 102. That is, the client computing device 102 sends a second request 108 to access website 116. The second request 108 includes the first cookie 106 and data about the client. The web server may then, after authenticating the client and establishing a session with the client, send a second cookie 110 back to the client. In addition, executable code is also sent with the second cookie to the client so that additional data can be obtained about the client. In some instances, the web server invokes or submits a request to a key management service 118 to encrypt the second cookie 110 before providing the second cookie 110 to the client. The key management service 118 may use a private key to encrypt the second cookie 110 so that the second cookie 110 is cryptographically secured. That is, in order to cryptographically secure the second cookie, the key management service 118 may obtains a private key (that is only accessible by the web service) to encrypt information in the second cookie 110. In some instances, the second cookie 110 includes a digital signature associated with the information in the second cookie 110 in addition to or instead of encrypting the information in the second cookie. Information contained in the second cookie 110 may include historical data about the client, so by encrypting the second cookie 110, information therein cannot be changed or altered since the web server is the only entity that can decrypt it. In other words, once the second cookie 110 is cryptographically secured, values in the second cookie 110 may then only be decrypted by the web server (which has access to the key management service 118).

Subsequently, a third request 112 may be sent from the client computing device 102 in an effort to establish a connection with web site 116 again. The third request 118 may contain the second cookie 110 (which has previous data/information about the client) and additional data about the client. However, prior to granting access to the client to access the website 116, a validating service 120 may perform a security check. The security check may be performed by a validation service 120 or server that obtains the second cookie 110 from the third request 112 and uses information associated with the second cookie 110 to obtain data about the client and compare it against the received additional data about the client.

In an example, a transaction between client computing device 102 and website 116 using cookies 106, 110, 114 may be as follows:

1. Client 102 requests a document from a website 116, and receives in the response:
   Set-Cookie: CUSTOMER=ABC_123; path=/; expires=Wednesday, 01-Nov-20 23: 12:40 GMT
2. When client 102 requests a URL in path "/" on this website 116, it sends:
   Cookie: CUSTOMER=ABC_123
3. Client requests a document, and receives in the response:
   Set-Cookie: PART_NUMBER=DOG_TOY_0001; path=/
4. When client 102 requests a URL in path "/" on this website 116, it sends:
   Cookie: CUSTOMER=ABC_123; PART_NUMBER=DOG_TOY_0001
5. Client 102 then receives:
   Set-Cookie: SHIPPING=MAILMAN; path=/foo
6. When client 102 requests a URL in path "/" on this website 116, it sends:
   Cookie: CUSTOMER=ABC_123; PART_NUMBER=DOG_TOY_0001
7. When client 102 requests a URL in path "/foo" on this website 116, it sends:
   Cookie: CUSTOMER=WILE_E_COYOTE; PART_NUMBER=DOG_TOY_0001; SHIPPING=MAILMAN In some instances, the security check is performed at a validation service 120 invoked by a proxy (not depicted in FIG. 1, but described in further detail below with respect to FIGS. 2-6). A proxy may be a separate device from the client computing device 102 or a service implemented by a server, a separate computing device, or a cluster of computing devices. In an example, the proxy service may be called upon as executable code, and if executed, to intercept requests from client computing devices 102. The proxy may then perform one or more actions (e.g., perform a security check), using the resources of the server, to the intercepted requests prior to connecting the client computing devices 102 to a computing resource, other services, and/or websites. In some embodiments, if the proxy intercepts a request without a cookie, the proxy redirects the client 102 to sign-in. After signing-in, the proxy sends information such as the customer ID, session ID, and device information to a validator to determine whether a request is valid and prior to providing the client with an authorization token to access resources.

The client computing device 102 may run instructions or code using JAVA™, Python™, Node.js®, C++, Ruby, Hypertext Preprocessor (PHP), and/or other programming languages to connect to this proxy. In an embodiment, the third request 118 from client computing device 102 is intended for website 116. However, the software developer's kit (SDK) of the client computing device 102 may be modified such that the client computing device 102 believes that the proxy is the actual endpoint (e.g., website 116). In order to do this, the endpoint-to-Domain Name Servers (DNS) look up table associated with the client computing device 102 may be altered. The look up table may be altered in a way that it can be run either using JAVA™, Python™, Node.js®, C++, Ruby, PHP, and/or other programming languages.

In an embodiment, the validating service 120, which performs the security check, may determine whether previously known data about the client compared to the newly received data about the client contain any anomalies. For example, the newly received data (e.g., the received additional data about the client) accompanying the third request may contain the amount of times the client has made requests to the website 116. This amount can be compared to the historical data about the client. If the amount of requests submitted by client, as indicated by the newly received data about the client, indicate that there was 10 requests per hour and previous history about the client indicate that only 2 requests are typically sent per hour, an anomaly may be present.

In addition, the newly received data about the client may also be compared to a predetermined threshold. The predetermined threshold may be determined by using historical data about the client that is stored at the web server. The web server may determine an average or a predetermined number for the client. This number may indicate a maximum number of requests over a certain time period, for instance, that is typically received by the website from this specific client. If the third request includes a number of requests that are being submitted to be higher than the threshold number, then the third request may be denied to access the website 116. In some instances, a failure to pass the security check results in a denial of access to the website 116 or, in some instances, limitations are placed when accessing the website 116. On the other hand, if the security check indicates that the third request does not come from a client with suspicious behavior, then the client may be authenticated and access to the website 116 may be provided. In some embodiments, access indicates what data (e.g., webpages) are provided to the client. In some instances, access may also comprise of sending additional data (e.g., different webpages) and/or resources to the client.

Additionally, after the security check authenticates the client who submitted the third request 112 to establish a connection with website 116, the web server may apply authorization rules that lays out what type of access and what type of role the client has to access the website. In some instances, the authorization rules may indicate which parts of the website the client may navigate. In addition, after authentication, the web server may invoke the key management service 118 to use a key to encrypt a third cookie 114. Similar to the previously sent cookies, the third cookie 114, may be sent to the client along with code that can be run to obtain data about the client. Thus, any subsequent requests, which for example, may include using a third cookie may be processed by a security check on the data about the client first. This security check may then determine whether the client who submits a fourth request is authenticated to access the website 116. Although only three requests are illustrated in FIG. 1, it is plausible that additional requests are sent from the client to establish a connection with website 116. All subsequent requests following the third request 112 would require security checks be performed prior to providing access. Any additional cookies that are provided to the client may also be encrypted by the key management service 118 prior to the client receiving it.

Figure 2:
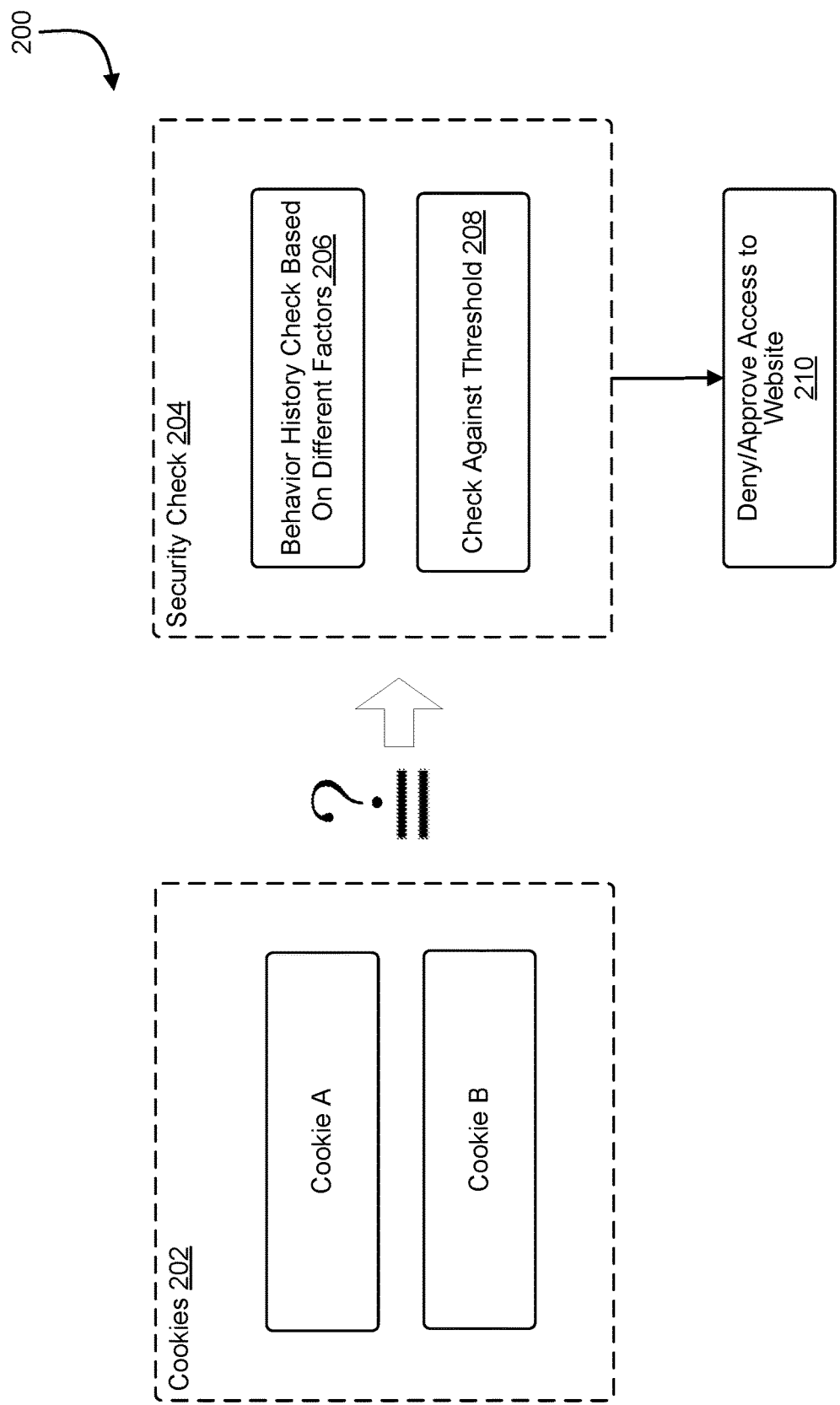
FIG. 2 illustrates a diagram for performing a security check using cookies linked to data about a client in accordance with an embodiment.

FIG. 2 illustrates a diagram 200 for performing a security check 204 using cookies 202 linked to data about a client in accordance with an embodiment. (Note that FIG. 2 illustrates two cookies—Cookie A and Cookie B—solely for illustration purposes. Hence, there may be some instances where only one cookie is used for information to determine whether a client is authenticated and in some other instances where both the cookies and/or more cookies are used to determine authentication.) For example, in order for a client who submits a request to be authenticated, cookies 202 associated with the client are used in comparison to one another. Historical data about the client can be found, for instance, by accessing information from one of the cookies 202. One of the cookies 202 (e.g., Cookie A) may have data embedded therein or has links to data about the client. This historical data is then used in a security check 204 to determine whether it matches the newly received data about the client received with the request. The security check 204 may be performed by the web server. However, in some embodiments, the security check 204 may be performed by a validation server (which is invoked by a proxy that intercepts the request). As described above, the security check 204, in this instance, takes the data about the client and determines whether it matches or compares with previous historical data about the client. The data includes many different client activity (behavior) factors 206 that may be compared against one another. For example, factors such the amount of last calls and/or certain patterns of client usage are all taken into consideration for the comparison. In some instances, these factors are checked against a threshold 208 to determine an amount of differences. The threshold may be a predetermined value or a range of values that is previously assigned to indicate whether a certain activity is an anomaly during a client session. The results of the security check 204 may determine whether a request is denied or approved to access the web site 210.

That is, all the information about the client are checked and analyzed in a security check 204 by using at least one of the cookies 202. Using cookies 202 that is configured to track and log behavioral history of a client session provides the information to do comparisons in the security check 204. If the information from at least one of these cookies 204 contain information that allows for identification of anomalous activities, then the security check 204 may indicate to the web server that the client is malicious and a potential threat such as a MitM may have occurred. As a result, access to the website may be denied. In the alternative, the security check 204 may make a comparison with the data received about the client to determine if the same or similar activity information is contained in the most recent cookie as previously logged activity information. If so, then access to the resource may be provided. On the other hand, if the information in the second cookie is not identical to the information contained in previous cookies then a potential threat such as a MitM attack may have occurred. As a result, access to the resource may then be denied in response to the request.

That is, the security check 204 may be performed using a comparison algorithm. Generally, a comparison algorithm is a set of instructions that take two values as input to determine whether they are the same value and output a response to indicate as such. That is, a comparison algorithm, as one example, includes a set of instructions or code that, when executed, compares the values in each of the fields contained in the cookies to determine if the fields match. In some instances, if information in a single cookie out of the plurality of previous cookies do not match the information contained in the cookies, then it may be determined that a MitM attack may have occurred and access to the resource may be denied. In some instances, when a single factor in a cookie is determined to not match a factor in previous cookies but all the other remaining factors match the previous cookies, the system may elicit or cause additional factors to be checked. That is, the additional factors are checked, and in some instances compared to a threshold, to determine whether the client sending this cookie is authenticated to access the resource.

Further describing FIG. 2, in addition to assuring that the information contained in cookies 202 matches or is similar to previous data about the client, a predetermined threshold (e.g., threshold value, quorum) may be determined. That is, the number of factors used to determine whether it matches the information contained in previous cookies may be predetermined. In one example, the threshold number may be set to three. Specifically, there has to be at least three fields (factors) of information that are identical to the information contained in the fields of previous cookies before determining that a current request can be trusted. This threshold number may be altered or dynamically adjusted based on many different reasons. In some instances, the threshold number may be adjusted to just one factor or two factors that contain information identical to the previous cookies. In another example, the threshold number may be any number greater than three.

Figure 3:
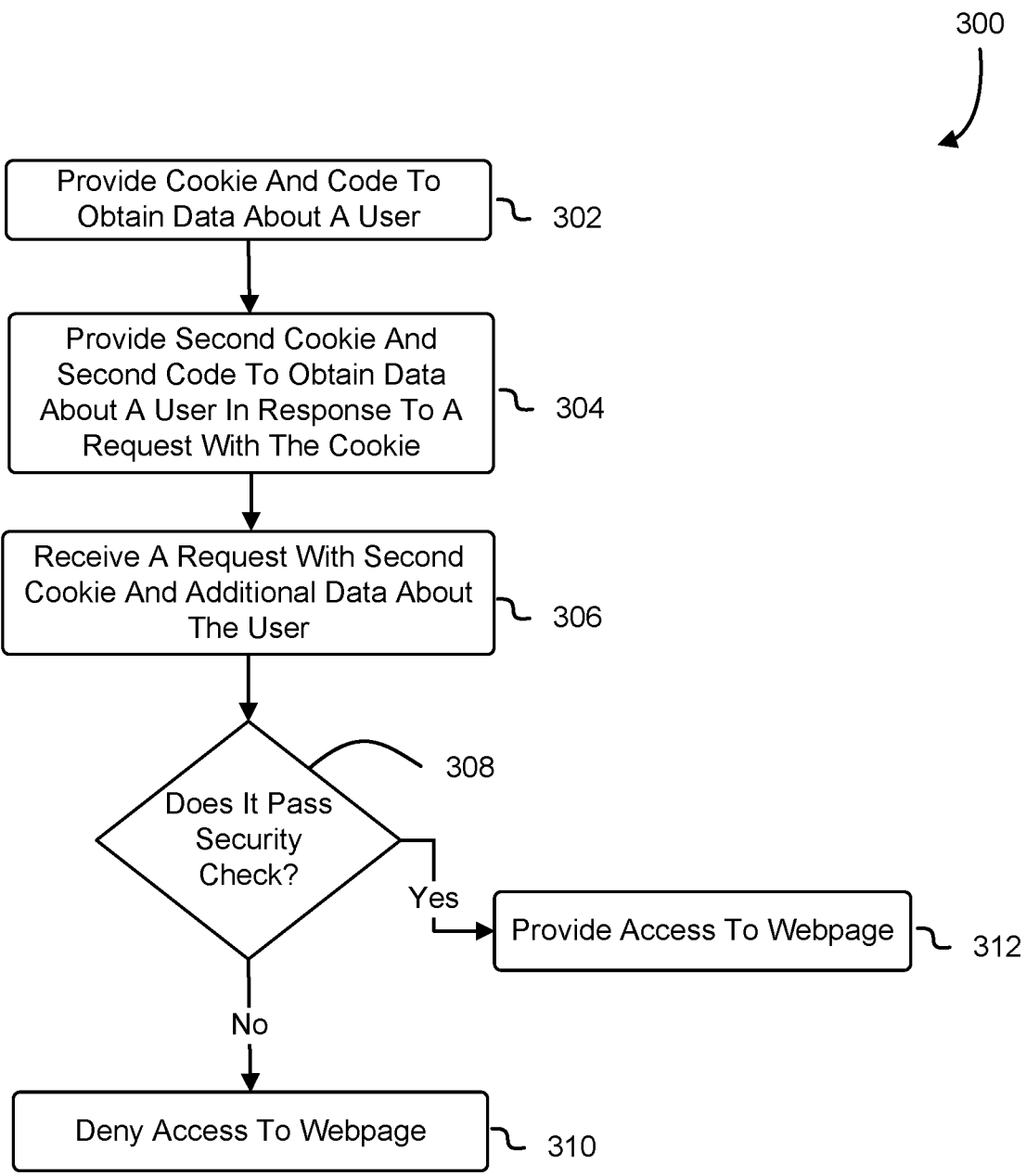
FIG. 3 illustrates a process for determining whether a client is authenticated based on a threshold in accordance with an embodiment.

FIG. 3 illustrates a process 300 for determining whether a client is authenticated based on a threshold in accordance with an embodiment. Specifically, in 302, for example, a cookie is provided by a client computing device that accompanies a request for access to a resource (e.g., webpage). The cookie may contain code that is executable when the client is navigating a webpage provided by a web server, to obtain data about the client. In an embodiment, after a client submits a second request (with the cookie) to access the same resource hosted by the web server, a second cookie may be generated by the web server and provided to the client. The second cookie may be encrypted by a private key that is managed by a key management service in connection with the web server. The information encrypted in the second cookie may include previous information about the client obtained while the client was using the first cookie to navigate the webpages provided by the web server. Once the web server receives another request from the client to access the same resource using the second cookie, the web server may then invoke the key management service to decrypt the second cookie to obtain data about the client 306. This data about the client may then be compared, by using a validating service, to additional data about the client. The comparison may be performed by executing a comparison algorithm. In some embodiments, the comparison to ensure that the client is authenticated to use the same resource may be referred to as a security check 308. The validating service performs the security check by analyzing the information contained or associated with the second cookie and determine whether it matches information that was received along with the most recent request. Once the validating service determines that the information contained in the second cookie is similar, for example, to the information received, the validating service may inform the web server to provide access to the resource (e.g., webpage) may be provided 312. In another example, if the security check is not passed as information in the cookie indicates that there is an anomaly when compared to the information received then the validating service may inform the web server to send a response to client indicating that access to the website is denied 310.

Figure 4:
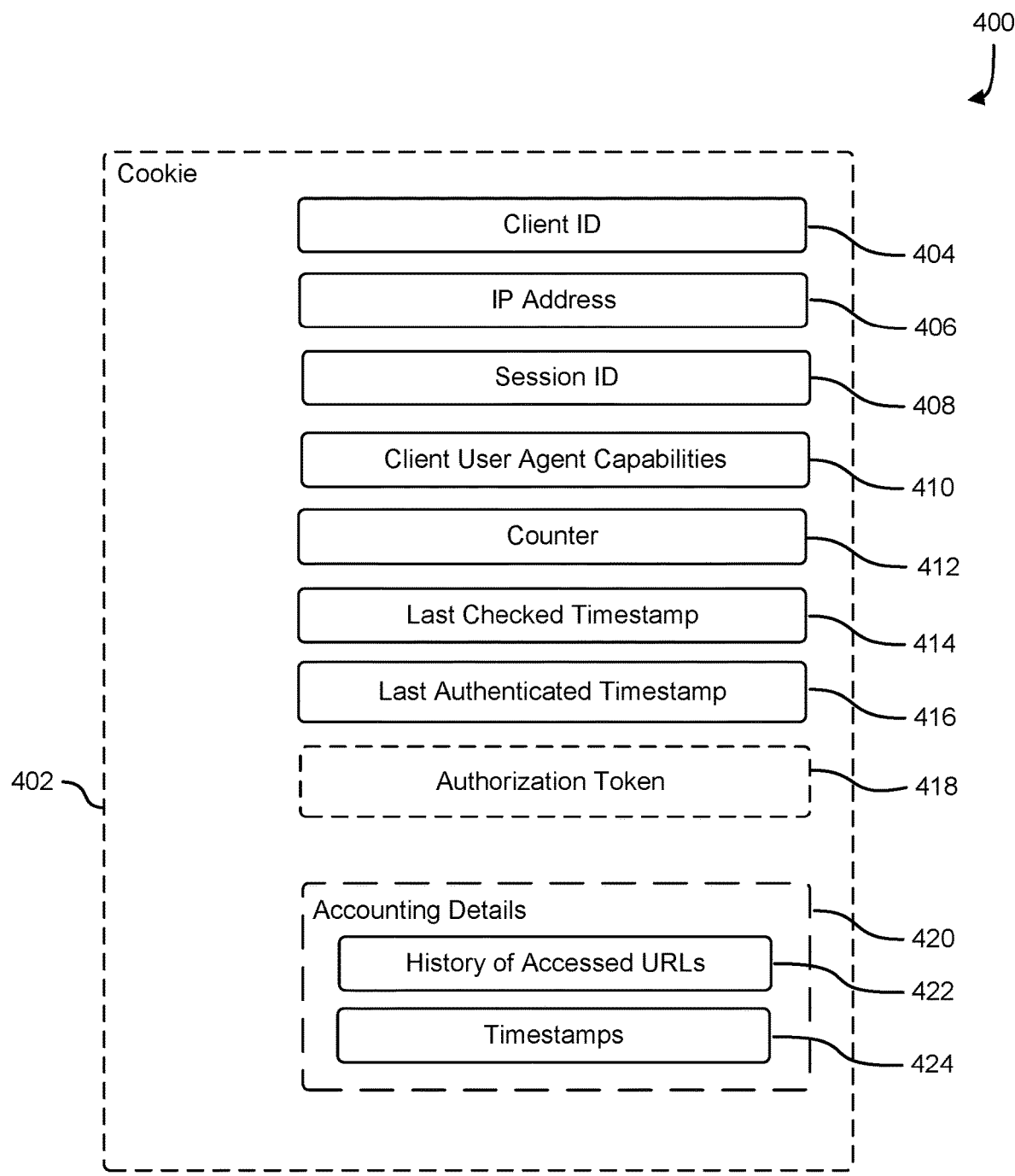
FIG. 4 shows a cookie in accordance with an embodiment.

FIG. 4 shows a diagram 400 of a cookie 402 in accordance with an embodiment. In an embodiment, a cookie 402 is a small text file that is stored by a browser on the client's computing device. In an embodiment, cookies 402 are simply plain text as it does not contain executable code. A web page or server instructs a browser to store this information and then send it back with each subsequent request based on a set of rules. Web servers can then use this information to identify individual clients. Once a client has inputted their credentials and established connection to a website, a cookie 402 is created for the client's browser and the client is then free to navigate to all parts of the website so long as that cookie 402 is present and validated. In an embodiment, a web server specifies a cookie to be stored by sending an HTTP header called "Set-Cookie." In some instances and as described herein, cookies 402 can also be referred to as a web cookie, a browser cookie, or an internet cookie. In some instances, cookies 402 are used for logging and tracking client activity information to help with different tasks required on many websites so that websites can remember information that is unique to the client the next time the client establishes connection with that website again. In an embodiment, cookies are used for tracking client activity or client behavior.

In an embodiment, a cookie 402 may include at least one of a client ID 404, an IP address 406, a session ID 408, client user agent capabilities 410, a counter 412, a last checked timestamp 414, and a last authenticated timestamp 416. In an embodiment, client ID 404 indicates the client's identifier or client name. In an embodiment, the IP address 406 is the network address where the client computing device sends the requests for access. The session ID 408 In an embodiment, client user agent capabilities 410 are described as other client signatures, other client characteristics, or other client features that are stored in the cookie 402. In an embodiment, a counter 412 (e.g., a hit counter) is a tracker that tracks the number of unique visits that a webpage receives. However, the counter will not count multiple visits from the same person on the same day, so that no one client can arbitrarily increase the number of hits a website seems to be receiving. In an embodiment, an authorization token 418 is also provided in the cookie 402. By putting the token in the cookie and setting that cookie to "HttpOnly," access can be prevented to the cookie by malicious client side script (e.g., cross site scripting (XSS)) as there would be no access to an "HttpOnly" cookie from JavaScript, the browser will protect it and handle sending the cookie only to the right origin. In an embodiment, the token 418 may be a JSON Web Token, which are an open, industry standard RFC 7519 method for representing claims securely between two parties. In an embodiment, the authorization token 418 includes information such as: service, namespace, policy details, expirations, and a signature. Additionally, in an embodiment, accounting details 420 (e.g., historical data) such as a history of accessed URLs 422 and timestamp of the URLs accessed 424 are also provided in the cookie 402. The accounting details described in FIG. 4 are just a couple examples as there may be more or less than the two illustrated. In some embodiments, additional details in the cookie 402 (not depicted in FIG. 4) include device type and a shoe size.

Figure 5:
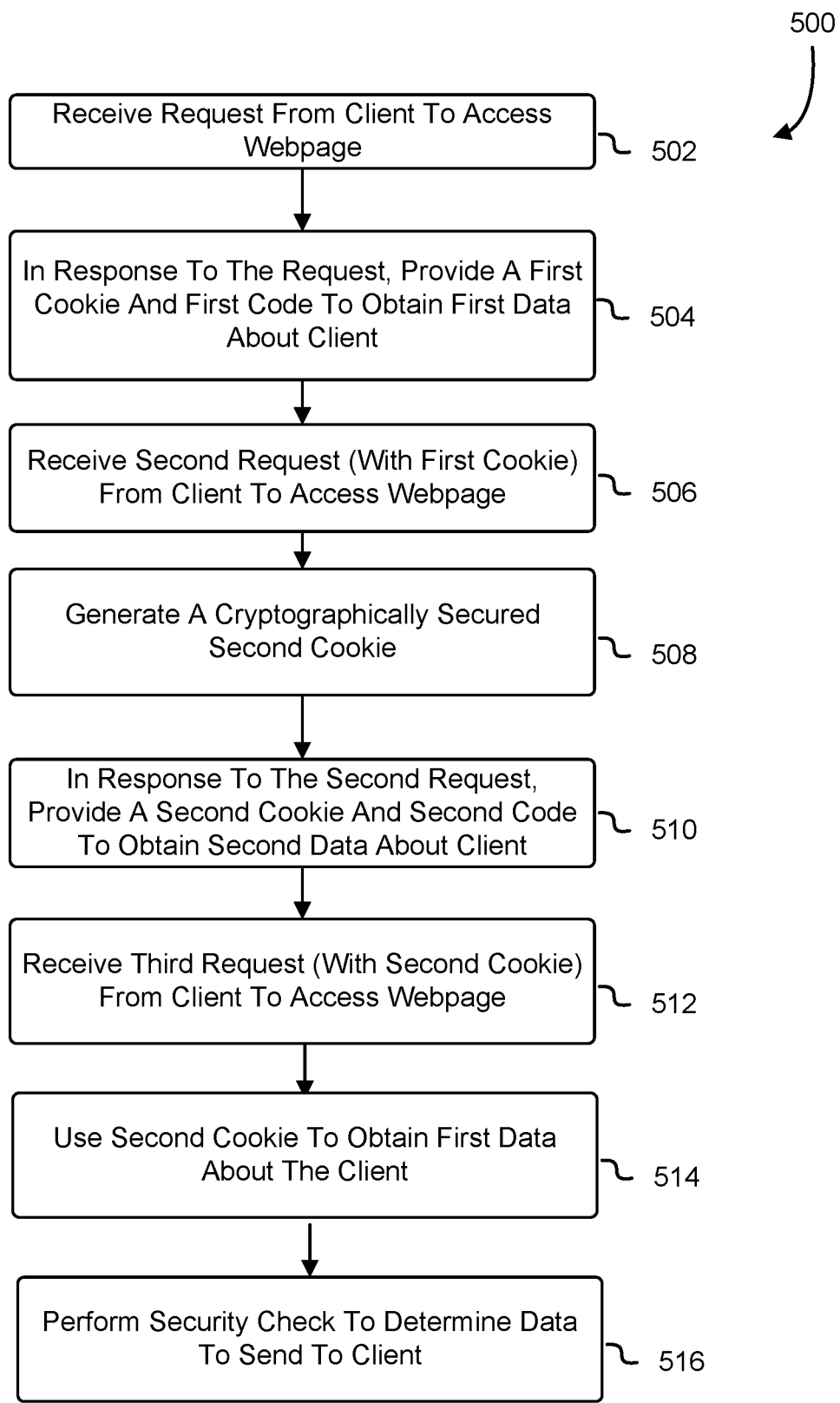
FIG. 5 illustrates a process for receiving cookies in response to requests sent from a client to access a webpage and determining whether the client is trustworthy in accordance with an embodiment.

FIG. 5 illustrates a process 500 for receiving cookies in response to requests sent from a client to access a webpage and determining whether the client is trustworthy in accordance with an embodiment. In an embodiment, a client may seek to access a web page by inputting a URL in a web browser. The request may be a HTTPS request that is sent to a web server for access to a resource (e.g., webpage) hosted by the web server 502. In an embodiment, the client may establish a session with the web server to access their resources. In an effort to understand and log activities of the client while the client is navigating the webpages, the web server provides a first cookie to the client and gives it a session ID. This cookie may be accompanied with code that can be run to log client activity while navigating the website. That is, in an embodiment, a first cookie and a first code (executable to obtain first data about the client) are provided to the client in response to the request for the webpage 504. In some embodiments, the web server forwards the request to a proxy to determine whether the client is authenticated and to further generate a cookie for the client.

In addition, once the client seeks to access another webpage (e.g., sub-domain) or the same webpage (e.g., main domain) hosted by the web server, the client may send a second request along with the first cookie to the web server 506. In some instances, the cookie is sent to multiple domains. In some instances, the proxy receives this second request directly and sends the second request to a validator to authenticate the client who submitted the second request. The client then receives a second cookie that may be cryptographically secured 508. The web server may invoke a key management service and use a private key managed by the key management service to encrypt the second cookie. Information encrypted in the second cookie may include client activity data about the client. The encrypted second cookie can then only be decrypted by using the same key of the key management service (which is managed by the web server). The second cookie may include a second code (that when executed) logs and obtains data about client activity and/or client behavior 510.

In an embodiment, the client seeks to access the same webpage or webpages hosted by the web server again by submitting a third request (with the second cookie). The proxy, in some instances, receives this third request 512 and submits the third request along with the second cookie to a validator prior to providing access to the webpage or webpages. In some embodiments, the validator operates from within the proxy. In some instances, the proxy invokes the key management service first to decrypt the information contained in the second cookie. The key management service may use the same private key that was previously used to encrypt the second cookie to decrypt it. The information in the second cookie may then be validated by a validator. The validator may parse each and every information obtained from the second cookie and compare it with information received about the client accompanying the third request to determine whether an anomaly exists. In some instances, the validator uses the recently received information about the client 514 and then compares it a record, template, and/or log stored on the web server prior to validating it. The record, template, and/or log may store information in the web server's in-memory cache that are related to the expected behavior of the client. The validator, in essence, may perform security checks on the received information by comparing the information with previous historical information about the client either by comparing cookies and/or a record maintained on the web server. In some embodiments, the check may include identifying whether there are no other clicks from that unique browser, if there were too many requests too fast, and/or whether updates from subsequent requests were received. If there is an anomaly such as there is a large spike in requests and/or certain client patterns are out of norm then the validator may indicate that the third request is invalid and deny the request. In an embodiment, if there is an anomaly, the client would be redirected to an alternative authentication method such as requiring the client to perform a custom Completely Automated Public Turing Test To Tell Computers and Humans Apart (CAPTCHA) operation, to sign in with credentials, and/or to perform surveys. In an embodiment, the security check performed by the validator determines what response to send to the client and further what data (e.g., access to the webpage or some alternate authenticate method), if any, is sent or provided to the client 516. That is, after performing the security check and comparing the data from the second cookie with information received about the client accompanying the third request, a plurality of different operations can be used to respond to the third request. Some examples include: throwing the CAPTHCA, providing a specific response if the client was not a bot, provide a page designed for a crawler (e.g., no images to conserve bandwidth), provide a hash puzzle or other computational or memory-based challenge, etc.

Figure 6:
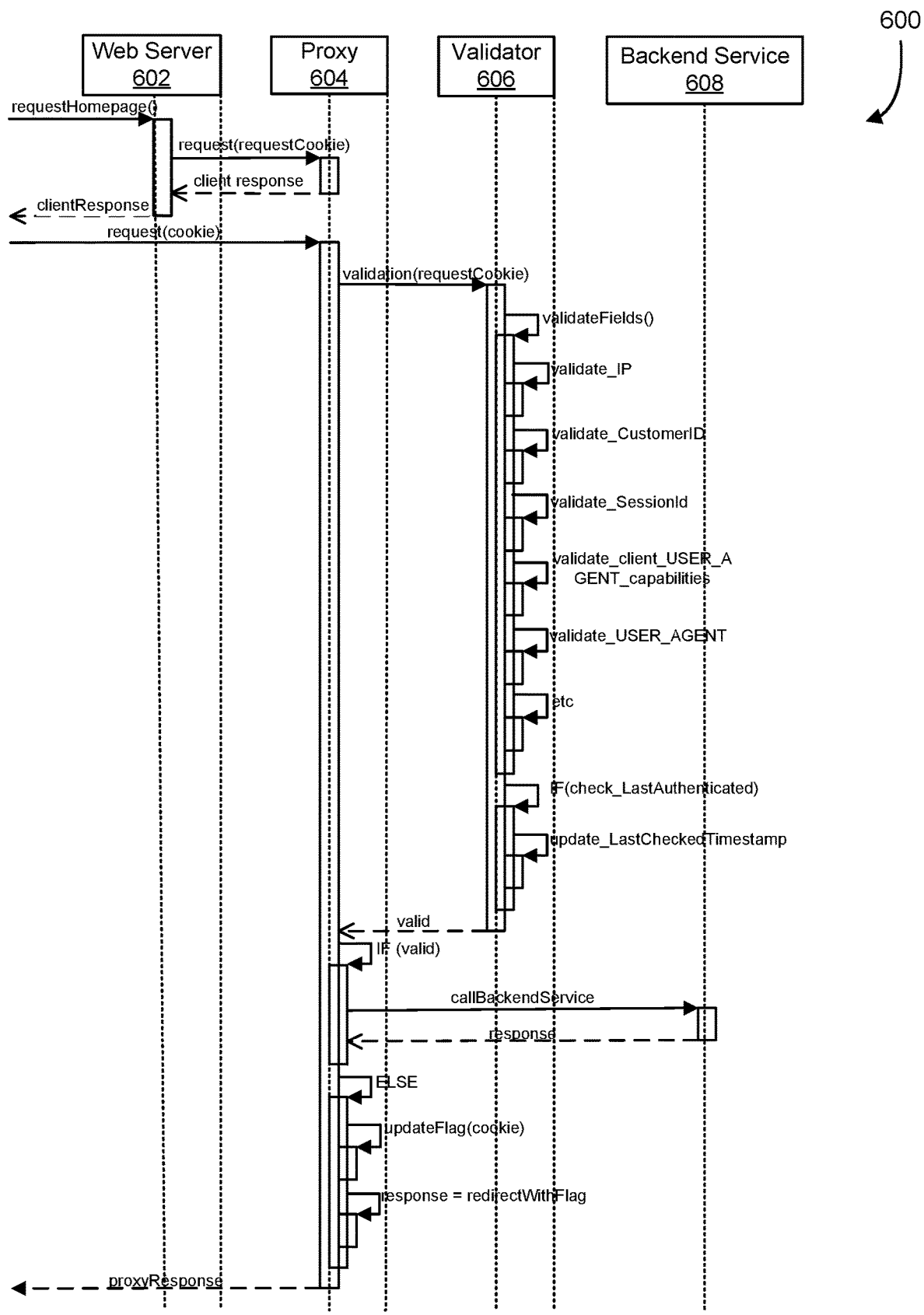
FIG. 6 illustrates a diagram that utilizes a validator to perform the security checks in accordance with an embodiment.

FIG. 6 illustrates a diagram 600 that utilizes a validator to perform the security checks in accordance with an embodiment. In an embodiment, a client that uses a computing device (not depicted in FIG. 6) sends a request to access a webpage (e.g., homepage). The request may be a HTTPS request received by a web server 602. The client may enter a URL into a web browser to access the webpage, which then causes a HTTPS request to be sent from the client to the web server 602 that hosts websites and webpages. In some instances, a proxy 604 is forwarded with the request from the web server to generate a cookie for the client. The web server 604 submits a request to the proxy 604 for a cookie to be used by a client that is connected via a session with the requested webpage. In an embodiment, the proxy 604 provides a response (e.g., the cookie or enhanced cookie) to the web server, which then sends it to the client.

In an embodiment, when a subsequent request from the client is sent to access a resource (e.g., the same webpage or different webpage) hosted by the web server 602, the request may be directly received by the proxy 604. Thus, any subsequent request stemming from the client (which includes a previously issued cookie) may be passed directly to the proxy 604. The proxy 604 then seeks to validate the request with the attached cookie. The proxy 604 may send a validation request with the cookie to a validator 606. The validator may be a service, application, or server that is configured to run instructions to validate the request. In some embodiments, the validator operates within the proxy and not separate from the proxy. In an embodiment, the validator 606 validates information that can be obtained from the cookie. In some embodiments, the information in the cookie are first decrypted using a key management service (not depicted in FIG. 6 but as described above). The key management service may be a service called upon by the proxy to use the same key that was previously used to encrypt cookies provided by the proxy to decrypt the information contained therein. Information contained in cookies may include fields such as IP addresses, customer ID, Session ID, client user agent capabilities, User_Agent names, timestamps, etc. Information such as these are used to validate whether the most recent request received by the proxy is validated.

The validator 606 may perform security checks such as validating whether the IP address in the cookie comes from a valid IP address that is authorized to access resources hosted by the web server 602. In an embodiment, the validator 606 also checks the last time the cookie was authenticated and uses that information to also determine whether the request can be validated. After checking the cookie, the validator 606 may update the field in the cookie with a timestamp to indicate that it was checked (e.g., updating the last checked timestamp). If all factors from the cookie are considered valid as determined by the validator 606, the response is sent to the proxy 604. The proxy 604 may then seek a backend service to provide the requested resource. The backend service 608 may provide a response such as access to the requests web page. If the validator 606 indicates that information from the cookie does not pass the security check then the proxy 604 may return a flag (indicating denial of the request). In some embodiments, the validator 606 may validate each of these factors or pieces of information against a template or a threshold value to determine whether the request is valid. For example, the validator 606 may determine whether the IP address from the cookie is the same as what the records have as the IP address for this client stored on the web server. In some instances, the response from the proxy 604 may be a redirect with the flag if the request is not validated. Thus, the response back to the client from the proxy 604 may either indicate that access to the resource is granted or denied.

Figure 7:
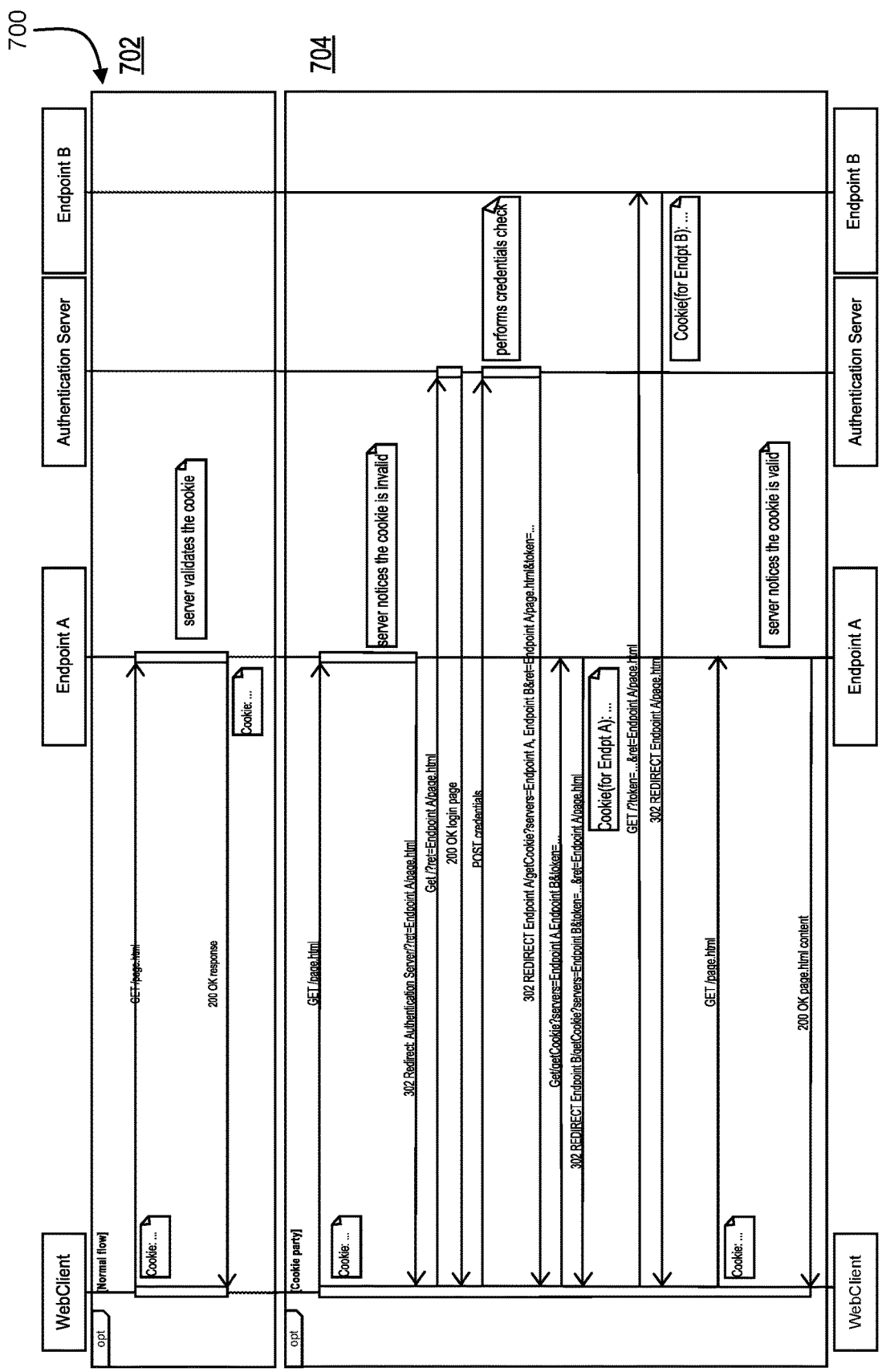
FIG. 7 illustrates a diagram that uses multiple endpoints to assign cookies in accordance with an embodiment.

FIG. 7 illustrates a diagram 700 that uses multiple endpoints to assign cookies in accordance with an embodiment. A typical flow 702, as illustrated in FIG. 7, indicates the process when a web client sends a request to access a resource or server (e.g., endpoint A). That is, a web client sends a request with a cookie to obtain access a webpage from endpoint A. Endpoint A validates the cookie provided by web client before providing a response to the web client indicating that the client is authenticated to access the webpage.

In an embodiment, in flow 704, as illustrated in FIG. 7, an alternate process may be performed to determine whether a web client's request is authenticated to obtain access to endpoint A. That is, flow 704 illustrates an example of a "cookie party," which involves at least two endpoints (endpoint A and endpoint B). Flow 704 takes advantage of simple redirects that inject in the web client also of any new piece of information being passed from one endpoint to another. In the example of flow 704, the information being passed is the authentication cookie itself, which may be embedded in a "token" parameter. In an embodiment, in flow 704, at least one or more additional endpoints are used to determine whether a cookie in a web client's request is valid. In some embodiments, more than two endpoints may be used (as two endpoints illustrated in FIG. 7 is just for illustration purposes), with the list of participating endpoints being embedded in a "servers" parameter. Additional rules can also be put in place in order to define the participant endpoints.

In at least one embodiment, a web client sends a request to endpoint A for access to a webpage. The server performs an analysis on the cookie to determine that the cookie is invalid (e.g., the cookie passed by the web client is invalid, absent, or some threshold associated with information in the cookie is breached). The server may redirect the web client to a webpage provided by an authentication server. In this instance, web client is to submit credentials (e.g., username and password) to the authentication server to perform a credentials check. After the authentication server performs the credentials check, the web client may receive information of a redirect and send another request to endpoint A. In an embodiment, a client-side redirect is implemented by code inside the content that instructs the web client to retrieve content from a different endpoint. In an embodiment, endpoint A, in response to this request, now returns a cookie to web client while also sending the web client information of a redirect to access a different endpoint (endpoint B). While obtaining access to endpoint B, web client may be provided with a second cookie from this different endpoint. In some embodiments, information of a redirect may include a list of endpoints/servers that the web client is able to access and eventually receive cookies from. Accordingly, flow 704 provides an instance where cookies are assigned across multiple domains. In other words, flow 704 can be understood as means of sharing information between domains (by using client side redirects). In an embodiment, other relevant usages of flow 704 include providing a mechanism that keeps accounting information replicated across domains. Every once in a while (e.g., a random request or every 1 out of 100 requests), a server may request the endpoints to share the accounting information (e.g., a list of last X accesses) with each other. The benefit of such action is that robot detection heuristics can be applied (on each endpoint) in order to assert that all traffic with known endpoints obey the rules.

Figure 8:
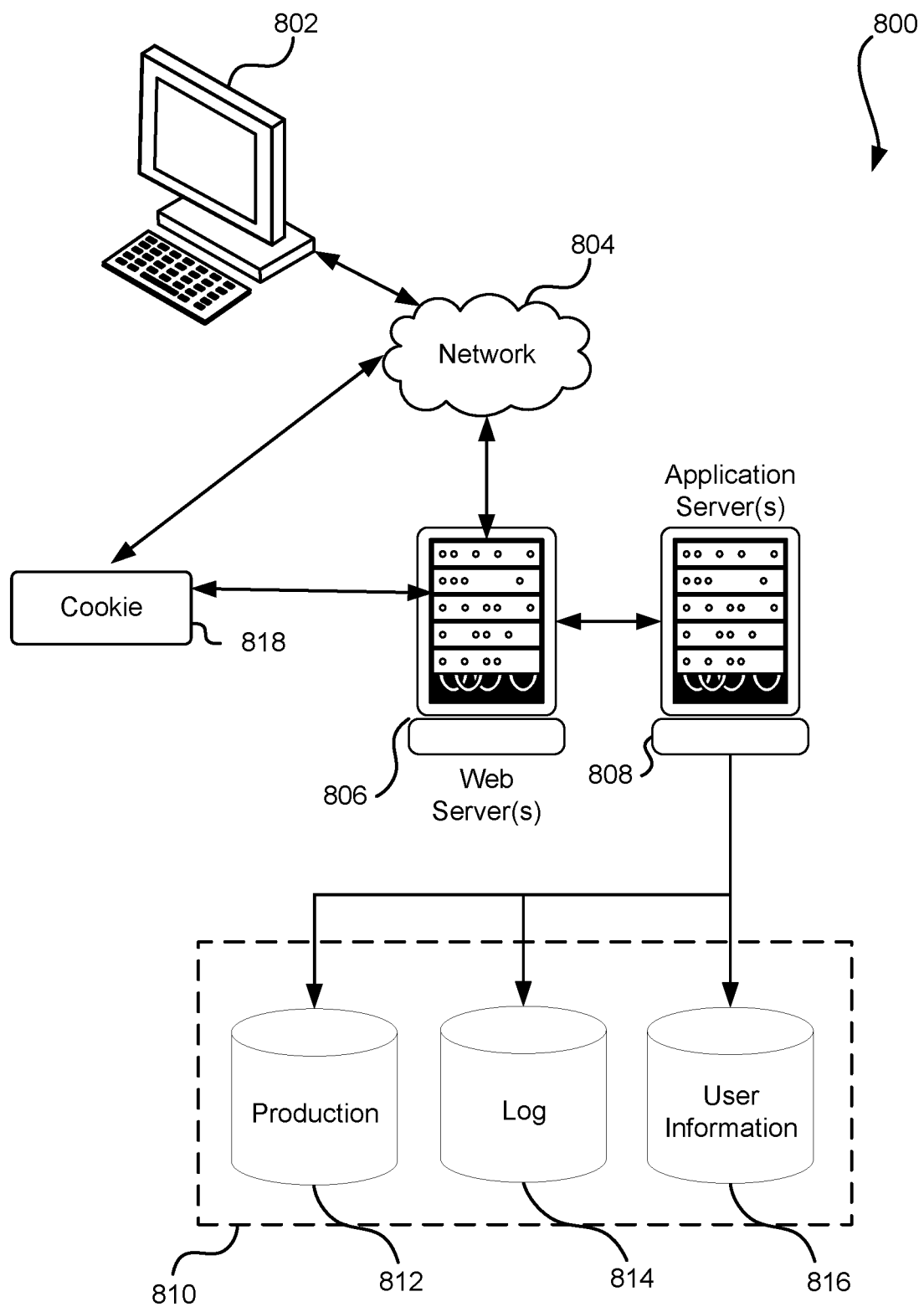
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular, or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network, or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art. In an embodiment, the web servers 806 provide cookies 818 along with code that can be run to obtain data about clients 802. In an embodiment, the web servers 806 receive requests from client devices 802 along with the cookies. The cookies are analyzed against historical data from previous cookies to determine whether a client who submitted the request is authenticated prior to providing access to resources hosted by the web servers 806.

In an embodiment, the illustrative system includes at least one application server 808 and a data store 810, and it should be understood that there can be several application servers, layers, or other elements, processes, or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered system. Data stores, in an embodiment, communicate with block-level and/or object-level interfaces. The application server can include any appropriate hardware, software, and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video, and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually, and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes, and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis, or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update, or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices, or processing devices that can be used to operate any of a number of applications. In an embodiment, user or client devices include any of a number of computers, such as desktop, laptop, or tablet computers running a standard operating system, as well as cellular (mobile), wireless, and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems, and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C#, or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers, or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing," are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
receiving, from a client, a first request to access a page on a website;
in response to the first request, providing a first cookie and first code to obtain first data about the client;
receiving, from the client, the first data about the client and a second request to access the website, the second request comprising the first cookie;
generating a second cookie that is linked to the first data about the client, the second cookie being cryptographically secured;
providing the second cookie and second code to obtain second data about the client in response to the second request;
receiving, from the client, a third request to access the website, the third request comprising the second data about the client and the second cookie;
causing the second cookie to be decrypted to obtain the first data about the client;
performing a security check by comparing the first data about the client and the second data about the client; and
using a result of the security check to determine data to send to the client.

2. The computer-implemented method of claim 1, wherein the first request is a HyperText Transfer Protocol Secure (HTTPS) request for access to the website and the second and third requests are HTTPS requests for access to the same website.

3. The computer-implemented method of claim 1, wherein generating the second cookie comprises encrypting the first data using a private key obtained from a key management service that is managed by a web server hosting the website, wherein the second cookie comprises the encrypted first data about the client.

4. The computer-implemented method of claim 3, further comprising:
  intercepting, at a proxy, the third request;
  sending an instruction, from the proxy to the key management service, to use the private key to decrypt the second cookie to obtain the first data; and
  sending a second instruction, from the proxy to a validation service, to perform the security check by using a comparison algorithm to compare the first data and the second data to determine whether the client is authenticated prior to providing access to the website.

5. A system, comprising at least one computing device configured to implement one or more services, wherein the one or more services:
  identify, a first request from a client to access a resource from a plurality of resources, first data about the client;
  generate a cookie that is linked to the first data about the client, wherein the cookie is cryptographically secured;
  identify, from a second request from the client to access the same resource from the plurality of resources, second data about the client, the second request being accompanied with the cookie;
  cause the cookie accompanying the second request to be decrypted to obtain the first data about the client; and
  compare the first data and the second data to determine how to process the second request.

6. The system of claim 5, wherein the one or more services further use a proxy to:
  intercept the second request;
  send an instruction to a key management service to decrypt the cookie to obtain the first data about the client; and
  send the first data and second data about the client to a validating service to perform a security check.

7. The system of claim 6, wherein the validating service performs the security check by using a comparison algorithm to determine whether information from the first data matches information from the second data.

8. The system of claim 7, wherein the validating service further determines an amount of differences between the first data and second data and compares the amount to a predetermined threshold.

9. The system of claim 8, wherein the validating service, if the amount of differences do not exceed the predetermined threshold, sends an instruction to a backend service to provide access to the resource in response to the second request.

10. The system of claim 5, wherein the one or more services of the system further send an instruction to a key management service to encrypt data about the client in the cookie, wherein the key management service is managed by the resource.

11. The system of claim 5, wherein the one or more services further:
  maintain a record, the record including a session identifier and information of expected behavior while the session identifier is in use; and
  perform a security check by using the second data and checking it against the record to determine whether the second request is submitted by an authenticated client.

12. The system of claim 5, wherein the resource comprises a webpage of a main website domain or multiple domains.

13. A non-transitory computer-readable storage medium having stored thereon executable instructions that, as a result of being executed by one or more processors of a computer system, cause the computer system to at least:
  identify, from a first request received from a client to access a resource, first data about the client;
  generate a cookie to contain the first data about the client, wherein the cookie is cryptographically secured;
  identify, from a second request from the client to access the same resource, second data about the client, the second request being accompanied with the cookie;
  decrypt the cookie accompanying a second request from the client to access the same resource to obtain data about the client; and
  operate in accordance with the results of a comparison between the first data and the second data.

14. The non-transitory computer-readable storage medium of claim 13, wherein the instructions further comprise instructions that, as a result of being executed by the one or more processors, cause the computer system to use a proxy to:
  generate the cookie in response to the first request;
  send the cookie to the client;
  intercept the second request with the cookie;
  send an instruction to a key management service to use a key to decrypt the cookie to obtain the first data about the client; and
  send the first data and second data about the client to a validating service.

15. The non-transitory computer-readable storage medium of claim 14, wherein the validating service executes a comparison algorithm to determine whether differences exists between the first data and second data.

16. The non-transitory computer-readable storage medium of claim 15, wherein the instructions that, as a result of being executed by the one or more processors, cause the computer system to return the cookie with a flag to the client if the differences between the first data and second data exceeds a predetermined threshold.

17. The non-transitory computer-readable storage medium of claim 16, wherein the instructions further comprise instructions that, as a result of being executed by the one or more processors, cause the computer system to use the proxy to send the client an alternative authentication method.

18. The non-transitory computer-readable storage medium of claim 13, wherein the instructions that, as a result of being executed by the one or more processors, cause the computer system to store expected behavioral activity about the client in a log on a web server.

19. The non-transitory computer-readable storage medium of claim 18, wherein the instructions that, as a result of being executed by the one or more processors, cause the computer system to compare the second data with the expected behavior activity about the client in the log to determine whether the client is authenticated to access the resource.

20. The non-transitory computer-readable storage medium of claim 13, wherein the resource comprises a webpage of a main website domain or sub-domain.

* * * * *